United States Patent [19]

Sweeney, Sr. et al.

[11] Patent Number: 5,584,630
[45] Date of Patent: Dec. 17, 1996

[54] ADHESIVELY SECURED PUMP FASTENER SYSTEM

[75] Inventors: Theodore J. Sweeney, Sr., Grosse Pointe, Mich.; Engelbert A. Meyer, Riverside, Calif.

[73] Assignee: Theodore Sweeney & Co., Inc., Detroit, Mich.

[21] Appl. No.: 424,375

[22] PCT Filed: Nov. 8, 1993

[86] PCT No.: PCT/US93/10726

§ 371 Date: Apr. 24, 1995

§ 102(e) Date: Apr. 24, 1995

[87] PCT Pub. No.: WO94/11643

PCT Pub. Date: May 26, 1994

[51] Int. Cl.⁶ ............................. F16B 39/00; F16B 37/06
[52] U.S. Cl. ............................. 411/258; 411/82; 411/930; 248/205.3
[58] Field of Search ........................ 411/69, 82, 171, 411/258, 930; 248/205.3

[56] References Cited

U.S. PATENT DOCUMENTS

| | | |
|---|---|---|
| 4,273,827 | 6/1981 | Sweeney et al. . |
| 4,425,065 | 1/1984 | Sweeney . |
| 4,555,206 | 11/1985 | Sweeney . |
| 4,657,460 | 4/1987 | Bien . |
| 4,693,652 | 9/1987 | Sweeney . |
| 4,822,224 | 4/1989 | Carl et al. .............................. 411/258 X |
| 4,830,558 | 5/1989 | Sweeney . |
| 4,853,075 | 8/1989 | Leslie . |
| 5,044,852 | 9/1991 | Sweeney et al. . |
| 5,277,530 | 1/1994 | Sweeney, Sr. et al. . |

*Primary Examiner*—Neill R. Wilson
*Attorney, Agent, or Firm*—Brooks & Kushman P.C.

[57] ABSTRACT

An adhesively secured fastener for use with a wide variety of substrates which provides a safer and more effective method of storing, transporting, delivering and using a quick setting adhesive while protecting against contact of the adhesive contained therein with the user of the fastener, and having a pressure sensitive adhesive for holding the fastener in place while the quick setting adhesive cures.

8 Claims, 6 Drawing Sheets

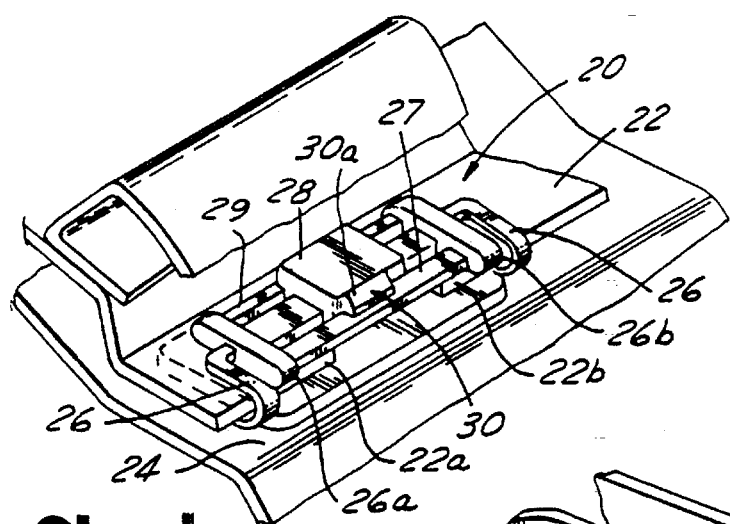
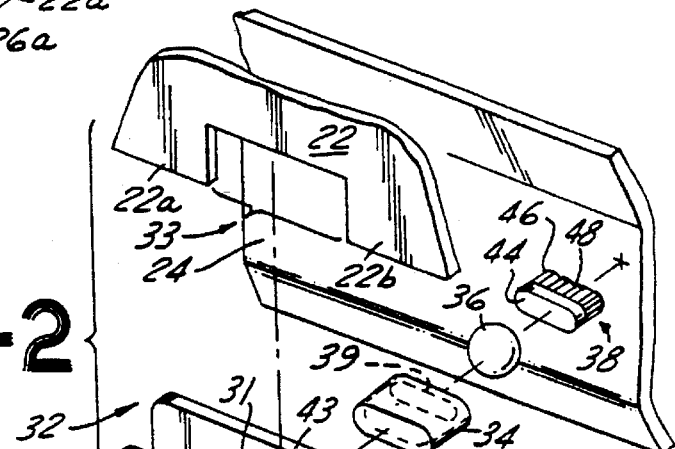
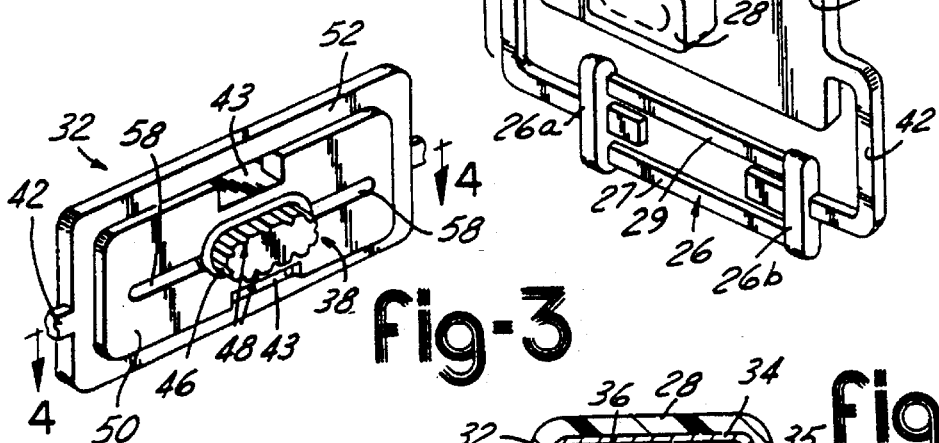
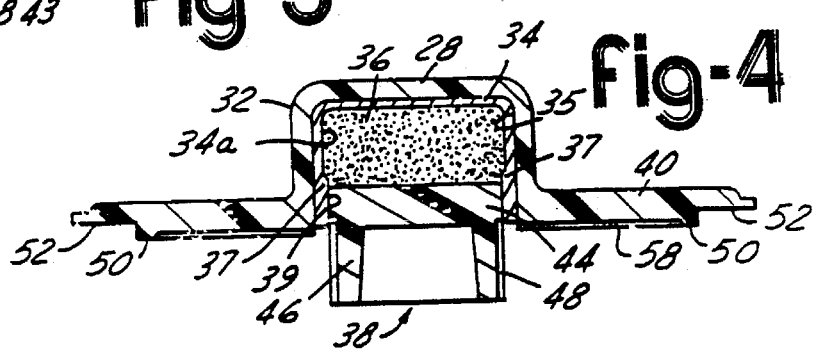

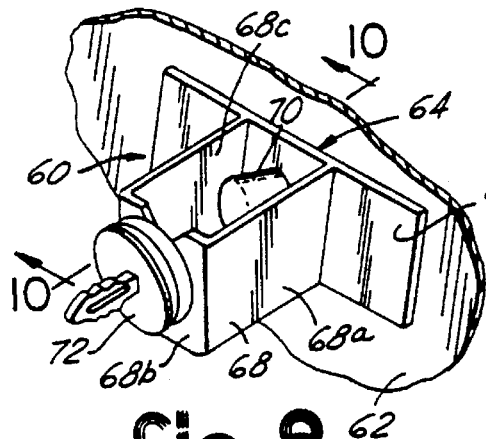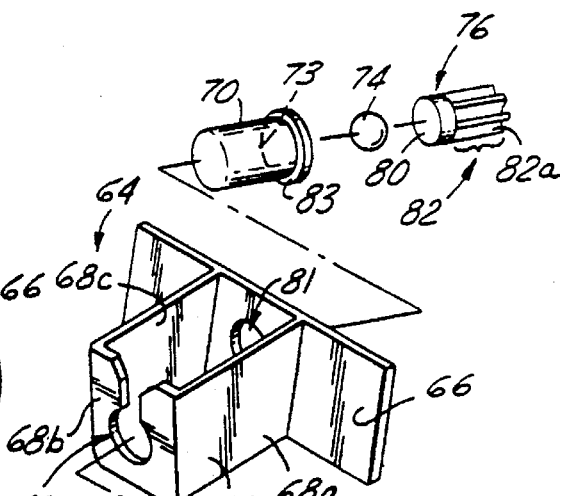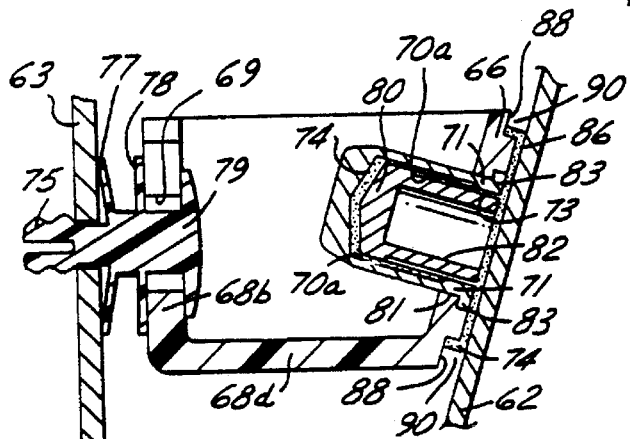

ADHESIVELY SECURED PUMP FASTENER SYSTEM

FIELD OF THE INVENTION

This application relates to adhesively secured fasteners utilizing quick setting adhesives.

BACKGROUND OF THE INVENTION

The advantages of quick setting adhesives in the automotive industry have long been known. These "holding" adhesives have the advantage of providing a rapid way of attaching one part to another without causing any physical degradation or deformation of either. However, while the quick set of these materials is often of primary importance, it often makes them difficult to use safely.

A safe and economical way to use these adhesives has long been sought. Fasteners containing their own internal supply of adhesive (herein referred to as adhesively secured fasteners), provide a way of storing, transporting and delivering a desired amount of adhesive to the site of attachment. They are designed so that one or more materials or objects may be mechanically attached to the fastener body which is adhesively secured to the underlying substrate. The use of quick setting adhesives in such fasteners facilitates the formation of bonds between two or more materials or objects, one or more of which may not be compatible with the adhesive. Additionally, the use of these fasteners often eliminates the need for any deformation or degradation of the various surfaces.

Several prior art patents have attempted to achieve adhesively securable fasteners using quick setting adhesives. U.S. Pat. Nos. 4,425,065; 4,555,206; 4,693,652; and 4,830,558, herein incorporated by reference, disclose adhesively secured fasteners having a quick setting adhesive positioned within the body of the fastener and means for causing the transference of said adhesive to a position outside the body whereby the body of the fastener is adhesively secured to a substrate. However, these prior art adhesively secured fasteners all possess the disadvantage of allowing uncontrolled transfer of the quick setting adhesive. Thus, these prior art fasteners contribute to the problem of accidental user contact with the adhesive.

However, U.S. Pat. No. 5,044,852 does attempt to address this problem. It discloses a vacuum fixed adhesively secured fastener. This fastener is designed so that adhesives released from an adhesive reservoir in the body of the fastener are contained by the vacuum and barrier-like action of the outer edge of the resilient plastic material of the fastener body. The vacuum fixed fastener can thus be handled without the danger of adhesive contact with workmen or other nondesired surfaces. However, the use of the vacuum fixed adhesively secured fastener is restricted to use on substrates of a non-porous nature and/or those which facilitate the creation of a vacuum with the resilient plastic material of the fastener body.

There is thus a need for an adhesively secured fastener for use on a wide variety of substrates which provides a safe and effective method of storing, transporting, delivering and using a quick setting adhesive. In particular, substrates such as wood fiber interior trim boards, cloth covered interior parts, headliners materials, and exterior parts comprised of plastic and fiber reinforced plastic, including SMC and BMC, having pockmarked or non-smooth surfaces, could utilize an adhesively secured fastener which provides a safe way to rapidly attach articles thereon.

Furthermore, such a fastener should be simple and easy to use while protecting against all possibility of accidental contact between the adhesive and the user of the fastener.

It is therefore an object of the invention to provide an adhesively secured fastener for use on a wide variety of substrates which provides a safe and effective method of storing, transporting, delivering and using a quick setting adhesive.

It is a further object of the invention to accomplish this objective while providing fasteners which protect against accidental contact of the adhesive with those using the fastener.

SUMMARY OF THE INVENTION

These and other objects of the invention are achieved with the use of the adhesively secured fasteners described herein. The adhesively securable fastener of the present invention comprises a fastener for adhesive attachment to a substrate comprising:

a body having a first surface to be adhered to the substrate;

a reservoir in the body;

means for displacing an adhesive contained within the reservoir into an interface formed when the first surface is placed against the substrate; and, a second surface peripherally surrounding the first surface and displaced from the plane thereof to overhang in spaced juxtaposition the substrate against which the first surface is placed so as to create a space around the first surface for containing excess adhesive extruded from the interface.

BRIEF DESCRIPTION OF THE DRAWINGS

FIG. 1 is a perspective view of a first embodiment of the present invention mounted on a substrate:

FIG. 2 is an exploded view of the elements of the adhesively securable fastener of FIG. 1;

FIG. 3 is a bottom perspective view of the fastener of FIG. 2 in an assembled state;

FIG. 4 is a cross-sectional view taken on the line 4—4 of FIG. 3;

FIG. 8 is a perspective view of a fastener comprising a second alternative embodiment of the invention mounted on a substrate;

FIG. 9 is an exploded view of the elements of the fastener of FIG. 8;

FIG. 10 is a cross-sectional view of the fastener taken along the line 10—10 of FIG. 8;

FIG. 11 is a bottom perspective view of the fastener of FIG. 8;

FIG. 12 is a cross-sectional view of an alternative embodiment of the fastener body of FIG. 8;

FIG. 13 is a bottom perspective view of a fastener comprising a third embodiment of the invention;

DESCRIPTION OF THE PREFERRED EMBODIMENTS

Figure 5:
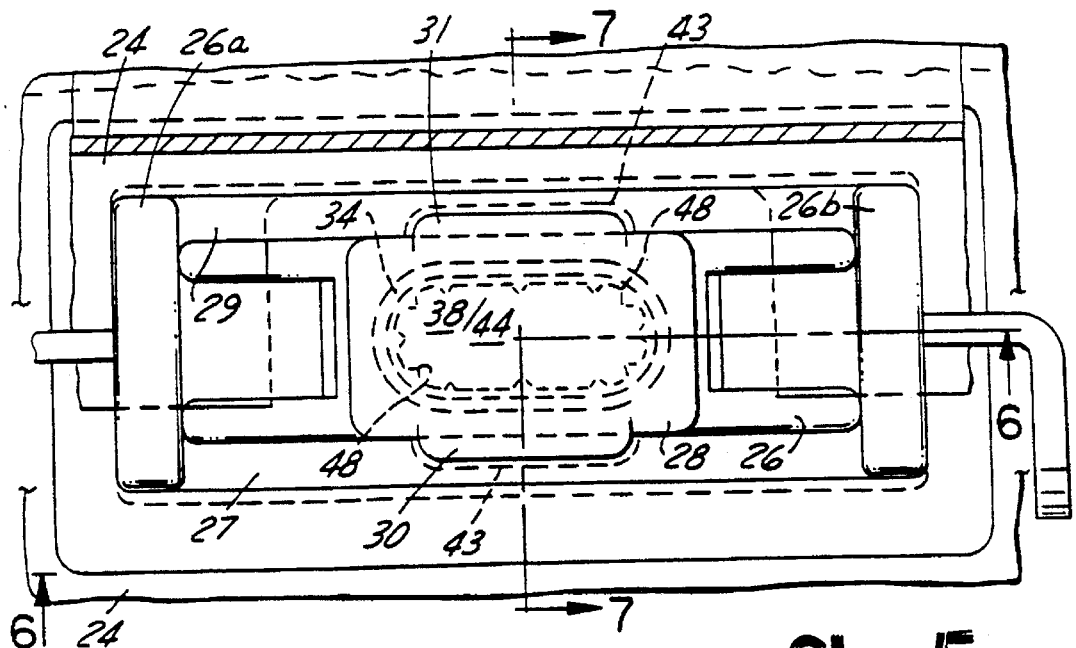
FIG. 5 is a top view of the adhesively securable fastener of FIG. 1.

The invention described herein provides for a safe and effective method of adhering the fastener body to a wide variety of substrates. The fasteners of the present invention are intended to function on a wide variety of substrates particularly those which are porous, pockmarked, rough and/or irregular.

Various configurations in the upper portion of the fastener apparatus provide a method of attaching a wide variety of items to numerous types of substrates without incurring any deformation or destruction of the physical integrity of either the substrate or item to be attached. It will be seen that the various alternative embodiments described herein represent just a few of the many configurations possible for the fasteners of the instant invention.

FIGS. 1 through 6 illustrate a preferred embodiment of the adhesively secured fastener which is intended to provide a means of securing, for example, an upper automobile roof piece 22 to a lower automobile roof piece 24. Typically, the upper and lower roof pieces 22 and 24 will be comprised of electro-deposition coated sheet metal and are designed to be permanently secured together with a structural adhesive such as a urethane epoxy. However, because such structural adhesives may take up to 72 hours to cure, it is necessary to secure the upper roof 22 to the lower roof 24 in such a way as to prevent any movement therebetween while the automotive body moves down the assembly line.

The fasteners of the instant invention as illustrated in FIGS. 1 through 6 may be used to provide a secure connection preventing movement between the upper and the lower roof pieces 22, and 24, to allow the structural adhesive sufficient time to achieve its full cure.

FIG. 1 illustrates fastener 20 adhesively secured to lower roof section 24 and mechanically fastening upper roof section 22 via the latching action of clasp 26 around hollow, upstanding post 28. Clasp 26 is prevented from lifting up off of hollow, upstanding post 28 by the retaining action of lips or hooks 30 and 31, illustrated in FIGS. 1, 2, 5 and 7 which engage over the parallel, stiffly resilient, rails 27 and 29. The rails will spread apart sufficiently to snap beneath the lips or hooks 30 and 31 when the rails are forced against the tapered surfaces 31a and 30a of the lips as the clasp is pressed down over the post.

Figure 6:
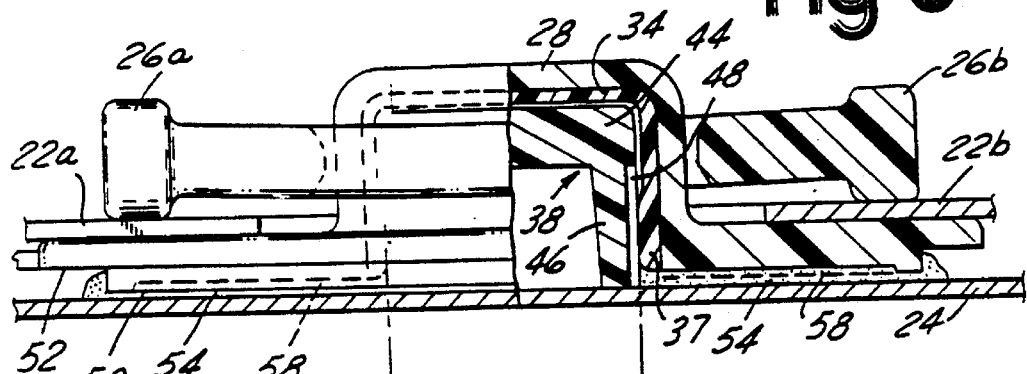
FIG. 6 is a cross-sectional view of the fastener taken along the line 6—6 of FIG. 5.

As illustrated in FIG. 2, upper roof section 22 has a notched area 33 through which the post 28 extends. This positioning allows clasp ends 26a and 26b to bear against tab portions 22a and 22b of upper roof section 22 as illustrated in FIGS. 1, 5 and 6, holding them together.

The interaction of the various elements of fastener 20 may also be seen in the exploded perspective view illustrated in FIG. 2. Fastener 20 is comprised of fastener body 32, reservoir 34, adhesive 36 and means for displacing 38.

Fastener body 32 is comprised of base member 40 and hollow upstanding post 28. It will be appreciated that post 28 serves two functions. First, with the use of lips 30 and 31, post 28 serves as the means for securing clasp 26 and thereby mechanically securing materials such as upper roof tabs 22a and 22b between base member 40 and clasp ends 26a and 26b. As previously discussed, upper roof section 22 should have an opening 33 to allow the positioning of post 28 therein. Second, as discussed below, hollow, upstanding post 28 provides a reservoir in which adhesive 36 is disposed.

Note that as illustrated in FIG. 2, fastener body 32, in addition to base member 40 and post 28, may also comprise living hinge 42 attached to clasp 26. If living hinge 42 is present, both it and clasp 26 may be considered to be part of fastener body 32. Of course, it will be appreciated by those skilled in the art that clasp 26 may be independent of fastener body 32 and unattached to living hinge 42 and base member 40. However, in this particular embodiment, it is most preferred that living hinge 42 be present in that it prevents inadvertent misplacement of clasp 26 prior to mechanical attachment of upper roof section 22 or the like.

In either case, fastener body 32 may be comprised of one or more materials such as wood, metal or plastic. Preferably the body 32 will be comprised of a rigid material. Most preferably, the fastener body 32 will be comprised of one or more plastics. Examples of suitable plastics include acrylonitrile-butadiene-styrene (ABS); acrylics; epoxys; phenolics; melamines; nylons; polycarbonates such as LEXAN™ (trademark of General Electric Co.); and polyolefins such as polyethylene, polypropylene, ethylene propylene diene monomer (EPDM), polyvinyl chloride and the like. Most preferably the fastener body 32 will be comprised of polycarbonate or ABS. Particularly hard and rigid grades of ABS will allow a greater variety of mechanical attachment means to be utilized.

It will be appreciated by those skilled in the art that the gaps and holes 43 shown in FIGS. 2 and 3 result from the molding processes employed to produce fastener body 32. Accordingly, it is within the scope of the invention that fastener body 32 be discontinuous in that it contains such holes and/or gaps 43. Most preferably, however, fastener body 32 should be free from all such holes and gaps in order to promote the uninterrupted flow of adhesive 36.

While it is possible that the hollow interior or cavity within post 28 may itself serve as an adhesive reservoir, the preferred construction contemplates that a separate reservoir element 34 fit securely within hollow, upstanding post 28. Accordingly, the contours or shape of cavity 35 within post 28 as shown in FIGS. 4–7, should correspond to the outside shape of reservoir 34. While the cavity 35 of post 28 is shaped as an oval and corresponds to the oval shape of reservoir 34, it will be appreciated by those skilled in the art that other shapes for both the inner cavity of post 28 and reservoir 34 are possible.

Although reservoir 34 may be contiguous with and comprised of the same material as the fastener body 32, i.e. base member 40 and hollow, upstanding post 28, it is most preferable that reservoir 34 be a separate element and comprised of a material different from that of fastener body 32. It will be appreciated by those skilled in the art that such a configuration allows for the optimum choice of materials for the respective elements of the fastener body 32 and the reservoir 34.

While considerations such as strength and rigidity are likely to be of primary importance in regards to the choice of material for fastener body 32, the most important consideration in choosing the material for reservoir 34 is that the material be non-reactive and inert with regards to adhesive 36. Most preferably, reservoir 34 will be comprised of a material such as polypropylene or polyethylene. Reservoir 34 may be fashioned in a wide variety of shapes to accommodate the configuration of the cavity within post 28. Reservoir 34 may have dissimilar outer and inner contours so as to provide a bridge between the shape requirements of fastener body 32 and the shape requirements of reservoir 34.

Adhesive 36 is intended to be disposed within reservoir 34. Although adhesive 36 is illustrated in FIG. 2 in the form of a spherical capsule, it will be appreciated that this is for illustrative purposes only and should not be considered limiting.

It is anticipated that a wide variety of adhesives are suitable for incorporation into the instant invention. Preferably, the adhesive used herein will be of the quick setting adhesive variety commonly known in the art. Suitable adhesives are discussed in the HANDBOOK OF ADHESIVES, 2nd Ed. edited by Irvin Guist, 1977, which is herein incorporated by reference. It will be appreciated by those skilled in the art that the choice of adhesive will depend upon the anticipated end use of the fastener. In general, the most relevant considerations will be the composition of the substrate and the required bond strength.

Examples of suitable adhesives include anaerobics, cyanoacrylates, urethanes and epoxys. Particular examples are 3M Scotch Grip #2353, manufactured by Minnesota Mining and Manufacturing, St. Paul, Minn.; Loctite 414, manufactured by Loctite Corporation, Newington, Conn.; Goodrich E2102B, E2101A, or E2101B, manufactured by B. F. Goodrich Chemical Company, Cleveland, Ohio and the urethane adhesive sold by UPACO Adhesive, Inc., 3 East Spitbrook Road, Nashua, N.H. Most preferably, the adhesive will be a cyanoacrylate such as the Loctite 414 mentioned above.

Although adhesive 36 will most commonly be a free flowing liquid substance, it is anticipated that encapsulated adhesives, including microencapsulated adhesives, such as those discussed in the previously referenced prior art patents, are also suitable for incorporation into reservoir 34 as adhesive 36.

Means for displacing the adhesive from the reservoir may be seen in FIG. 2 in the depiction of fastener 20 in its unassembled state as a plunger-like apparatus 38 having a first or head portion 44 and a second or foot portion 46. The position of plunger 38 within the reservoir 34 and fastener body 32 depends upon the status of the fastener.

When fastener 20 is in an assembled and ready-to-use state, as for example, its transport or delivery mode, as illustrated in FIGS. 3 and 4, the plunger blocks the escape of adhesive from the reservoir and provides a secure closure for the open end 39 of the reservoir. This is accomplished by the first or head portion 44 fitting snugly within the open end 39 of reservoir 34. The "snug" fit between first portion 44 and reservoir 34 is achieved with the use of thickened reservoir walls 37 which provide a reduced inside diameter open end 39. The remainder of the inside of the reservoir is of greater inside diameter as at 34a whereby adhesive in the reservoir can flow around the head portion 44 as the plunger is pushed into the reservoir. The reduced diameter of the reservoir at opens end 39 creates a tight fit with the head portion 44 and allows the assembled, ready-to-use fastener to be safely transported without fear of accidental displacement of the plunger 38.

When in this assembled and ready-to-use state, the second or foot portion 46 of plunger 38 will extend outwardly beyond the open end 39 of reservoir 34. Once adhesive 36 is disposed within reservoir 34, it is effectively "sealed" within reservoir 34 by said placement of head portion 44 within the open end 39 within the thickened reservoir walls 37. As a result, adhesive 36 will be maintained in the interior of reservoir 34 in a ready-to-adhere condition.

It will be appreciated by those skilled in the art that plunger 38 should be comprised of a material that is non-reactive and inert with regards to adhesive 36. Preferably the plunger 38 will be comprised of the same material as reservoir 34. Most preferably, plunger 38 will be comprised of polypropylene or polyethylene.

Turning briefly to FIG. 6, it will be seen that when the fastener 20 is pressed or deployed against a substrate such as lower roof section 24, the plunger 38 will be pushed into the reservoir in post 28 displacing the adhesive therefrom. Preferably, the plunger 38 is sized so as to fit closely within the interior cavity of reservoir 34 and thus deploy the maximum amount of adhesive 36 therefrom.

The deployment of fastener 20 from its transport or delivery mode to an "adhered mode" can be understood with a review of FIGS. 3, 4, 6 and 7. FIG. 3, illustrating a bottom perspective view of the fastener 20 of FIG. 2 in an assembled state, shows first surface 50, which surrounds the open end 39 of the reservoir and is that portion of fastener body 32 which directly engages in the formation of the adhesive bond with the substrate, in this case lower roof section 24. As shown in FIGS. 3, 4 and 6, surrounding the periphery of the first surface 50 is second surface 52 which lies in a plane displaced from the plane in which first surface 50 lies.

Figure 7:
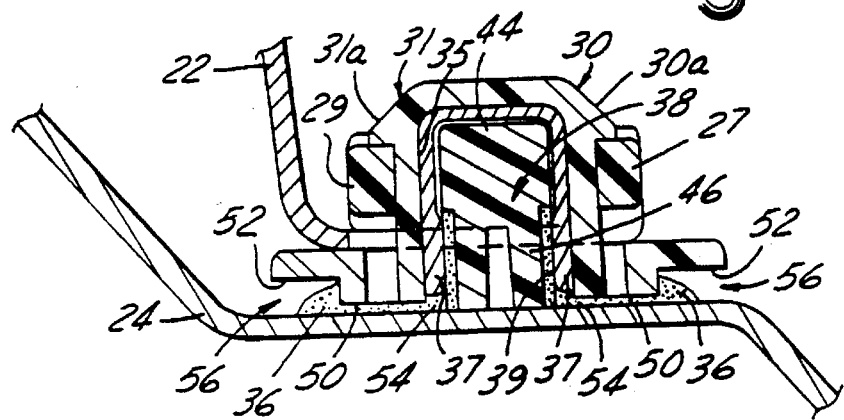
FIG. 7 is a cross-sectional view of the fastener taken along the line 7—7 of FIG. 5.

When the fastener 20 is ready to be adhered to a substrate, it is pressed toward the substrate such that first surface 50 is urged there against such as lower roof section 24, such that an interface 54 is created therebetween which is illustrated in FIGS. 6 and 7. As a result of the movement of first surface 50 toward lower roof section 24, the second portion or foot 46 of the plunger 38 is forced against lower roof section 24. This movement causes the initial displacement of first portion 44, and ultimately of the entire plunger 38, into reservoir 34. The movement of means for displacing 38 into reservoir 34 causes the outward flow and displacement of adhesive 36 through the open end of the reservoir 34 and around foot portion 46. The adhesive 36 flows into interface 54 which surrounds the open end 39 of the reservoir.

It should be noted that interface 54 has been shown to be greater than what may be reasonably expected in actual use. That is, for the purposes of illustration only, the amount of adhesive 36 used in the formation of the adhesive bond and contained within the interface 54 has been enlarged. Most preferably, the size of interface 54 and the quantities of adhesive 36 employed in fastener 20 will be minimized as much as possible. The amount of adhesive 36 used in the fasteners of the instant invention is a function of the adhesive strength, the composition of the substrates and first surface 50, as well as the desired bond strength.

The movement of adhesive 36 from reservoir 34 is facilitated by the presence of means for directing 48 located on the second portion 46 of means for displacing 38. Means for directing 48 are intended to aid in and control the outward flow of adhesive 36 from reservoir 34. Most preferably, such means for directing 48 will be comprised of vertical grooves running the length of second portion 46. These vertical grooves are best illustrated in the perspective views of FIGS. 2, 3 and in the top view of FIG. 5. The side cut-away views of FIGS. 4, 6 and 7 also show said means for directing 48.

Of course, those skilled in the art will appreciate that while the fastener of the instant invention will preferably include such means for directing 48, such means may be considered an optional element and the foot portion may simply be of smaller cross-section than the head portion 44 so that when the foot portion enters the open end 39 of the reservoir the adhesive will be able to exit the reservoir. Most preferably, however, the fasteners disclosed herein will comprise means for directing 48 in the form of vertical channels as illustrated herein. Such channels or grooves will control and help distribute the flow to insure relatively uniform amounts of adhesive are distributed evenly to the interface.

As previously discussed in regards to FIG. 3, the second surface 52 surrounds the periphery of first surface 50 and lies in a plane displaced from the plane of first surface 50. Briefly turning to FIGS. 6 and 7, when the firsts surface 50 is placed against lower roof section 24, the displacement of the planes in which first surface 50 and second surface 52 lie causes the second surface 52 to overhang in spaced juxtaposition the lower roof section 24. The resulting spaced juxtaposition of second surface 52 relative to lower roof section 24, creates an enlarged space 56 into which excess adhesive flowing from interface 54 will be contained.

If the adhesive is not an anaerobic adhesive, and cures upon contact with oxygen, rapid setting and curing of the adhesive 36 will occur in the space 56 and cause containment and non-movement of adhesive 36 therefrom. Alternatively, if adhesive 36 does not cure upon contact with oxygen, for example an anaerobic adhesive, the protective overhang of second surface 52 will contain and prevent accidental user contact with the uncured adhesive 36.

The movement of adhesive 36 from the open end 39 of reservoir 34 resulting from the displacement of means 38 into reservoir 34 may be facilitated by the use of means for distributing 58, which aids in the flow of adhesive 36 throughout the interface 54. Said means for distributing 58 are illustrated in FIG. 3 in the form of channels lying in the plane of and on the first surface 50. Likewise, the cross-sectional views of FIGS. 4 and 6 illustrate means for distributing 58 as these same channels. It will be noted that channels 58 stop short of the outer peripheral edge of surface 50.

It will be appreciated by those skilled in the art that numerous variations consisting of a plurality of grooves or channels running in various directions could be utilized as suitable mechanisms for means for distributing 58. It will also be appreciated by those skilled in the art that any mechanism which operates on the principle that a liquid will choose to travel in the path of least resistance will serve as a suitable means for distributing 58.

Although a review of FIGS. 3, 4, 5, 6 and 7 provides a general approximation of the relative area of second surface 52 to first surface 50, it will be appreciated by those skilled in the art that the relative dimensions of first surface 50 and second surface 52 may be varied as a function of the quantity of adhesive 36 contained within reservoir 34.

FIGS. 8 through 12 illustrate a second alternative embodiment of the invention.

FIG. 8 provides a perspective view of fastener 60 adhesively secured to wood fiber interior trim board 62.

As illustrated in the exploded perspective of FIG. 9, fastener body 64 is comprised of base member 66, attachment bracket 68, and so called Christmas tree attachment 72. Attachment bracket 68 consists of walls 68a and b perpendicularly attached to base member 66, bottom wall portion 68d perpendicularly attached thereto and front wall portion 68b perpendicularly attached to wall portions 68a, c and d. Contained within the plane of front wall portion 68b is opening 69 which acts to secure Christmas tree attachment 72 therein.

The interaction of Christmas tree attachment 72 and opening 69 is illustrated in FIG. 10 wherein back portion 79 is positioned behind opening 69 in front wall portion 68b. Middle portion 78 of attachment 72 is positioned in front of opening 69 in wall portion 68b. A second substrate 63 may be attached to substrate 62 via the impaling action of attachment prong 75 of Christmas tree bracket 72 and is illustrated in FIG. 10.

Attachment bracket 68 may take the form of the alternative embodiment illustrated in FIG. 12. Here attachment bracket 68 is further comprised of sloping vertical wall 68e as illustrated in FIG. 12. While not necessary, diagonal Wall 68e acts to impart increased strength and rigidity to the fastener body 68 and to eliminate the possibility of any interaction between reservoir 70 and Christmas tree attachment 72.

While base member 66 and attachment bracket 68 of fastener body 64 will most preferably be comprised of the same material, they may be comprised of a dissimilar material. Although not necessary, Christmas tree attachment 72 will preferably be comprised of one or more different materials. Suitable materials for fastener body 64 and Christmas tree 72 are those discussed above in regards to fastener body 32. Most preferably, base member 66 and attachment bracket 68 will be comprised of Lexan®[1] and Christmas tree attachment 72 of nylon.

[1] Trademark of General Electric Company.

It must be noted that Christmas tree attachment 72 is simply one depiction of a device well known in the art and that various other embodiments of this aspect of the invention are possible.

Reservoir 70 which serves as a repository for adhesive 74 and means for displacing 76, fits snugly within opening 81 of base member 66. Opening 81, shown in FIGS. 9, 10, and 12, consists of first cavity 81a and second cavity 81b. First cavity 81a has a diameter less than that of second cavity 81b.

Reservoir 70 is secured by the placement of flange 83 into second cavity 81b as illustrated in FIG. 10. Securing flange 83 surrounds the periphery of the lowermost portion of reservoir 70 and has a width greater than that of thickened reservoir walls 71. When securing flange 83 is placed inside outer cavity 81b, reservoir 70 is prevented from movement therefrom by the secure fit of reservoir 70 within the lesser diameter of inner cavity 81a.

Adhesive 74, depicted as a sphere for illustrative purposes only, will be located within reservoir 70 and will be initially sealed by the positioning of the first portion or head 80 of plunger 76 within the open end 73 of reservoir 70 and later deployed by the inward action of lower portion or foot 82 of plunger 76. The head portion 80 of the plunger has a larger effective cross-section than the foot portion 82 because the latter has distribution channels or grooves 82a on its cylindrical surface similar to the channels 48 previously described.

The reservoir open end 73, it will be noted, is of a smaller inside diameter than the remaining inside diameter of the reservoir as at 70a so that adhesive in the reservoir can flow around the head 80 of the plunger 76 to enter the channels 82a in the plunger.

The channels 82a extend from beneath the head portion 80 to the opposite end of the foot portion 82. When the latter is disposed in the open end 73 of the reservoir, adhesive previously contained in the reservoir can flow out of the reservoir 70 through the channels 82a.

As illustrated in FIG. 10, means for displacing in the form of plunger 76 is disposed within reservoir 70. FIG. 10 represents fastener 60 in an adhered state relative to trimboard 62 and mechanically attaching a second substrate or panel 63 thereto.

Briefly returning to FIG. 8, it will be appreciated that when the first portion or head 80 of the plunger 76 is positioned in the open end of the reservoir 70 so as to be in intimate contact with thickened reservoir walls 71, adhesive 74 will be effectively sealed therein. Adhesive 74 will thus remain in a ready-to-adhere state. Most preferably, adhesive 74 will be as previously described and will be in a flowable liquid state. The materials comprising both reservoir 70 and means for displacing 76 will most preferably be comprised of polypropylene or polyethylene as discussed above.

It will be appreciated by those skilled in the art that when first portion 80 of means for displacing 76 fits within the open end 73 of reservoir 70 by virtue of thickened reservoir walls 71, second portion 82 of means for displacing 76 will extend beyond reservoir 70. In such a position, when first surface 84, illustrated in FIG. 10, is placed against wood fiber interior trim board 62, the direct contact of second portion 82 against the surface of wood fiber interior trim board 62 will cause the complete displacement of means 76 into reservoir 70. As a result, adhesive 74 will be displaced into the interface 86 created by the direct communication of first surface 84 with wood fiber interior trim board 62.

FIG. 11 is a bottom perspective view of the fastener of FIG. 8 with the substrate 62 removed. Surrounding the periphery of first surface 84 is second surface 88 which lies in a plane displaced from that of the plane in which first surface 84 lies. As illustrated in FIG. 10, when the fastener 60 is in an adhered state, the displacement of the plane in which second surface 88 lies relative to the interior trim board 62, creates space 90 into which excess adhesive 74 flows into. The relative displacement will cause second surface 88 to overhang in spaced juxtaposition the first substrate, which in this embodiment is to be wood fiber interior trim board 62. The presence of space 90 eliminates the risk of accidental user contact.

As a result of the nature of the wood fiber interior trim board 62, no channels analogous to that of means for distributing 58, seen in fastener 20, in FIG. 3 are illustrated on first surface 84. However, such means 58 could be employed in this embodiment if desired.

It will be appreciated by those skilled in the art that the dimensions of second surface 88 and first surface 84 may be enlarged or decreased as desired in relation to the amount of adhesive 74 contained within reservoir 70.

FIGS. 12 and 13 describe a third alternative embodiment of the invention. The fastener 92 is shown in its adhered state in FIG. 13. FIG. 12 is a bottom perspective of the fastener of FIG. 13. It is intended to function as a wiring clip useful for attaching wires to soft automotive trim. Using this embodiment of the invention, one or more wires or clusters of wires 94 can be secured to an underlying substrate such as an automotive headliner 96.

In this embodiment, fastener 92 is comprised of fastener body 98 and wiring clip 104. The fastener body 98 is comprised of hollow, upstanding post 100 and base member 102. Attached to hollow, upstanding post 98 for the purpose of securing wires 94 is wiring clip 104.

The bottom side of base member 102 consists of first surface 106. Surrounding the periphery of first surface 106 is second surface 108. As in the other previously discussed alternative embodiments of the invention, second surface 108 lies in a plane displaced from that of the plane in which first surface 106 lies. This displacement creates a space 110 when first surface 106 is positioned against the surface of headliner 96.

When means for displacing 112 is displaced into reservoir 114, adhesive 116 flows into the interface 118 created by the direct communication of first surface 106 with headliner surface 96. Excess adhesive flowing from interface 118 is collected and contained within space 110, thus preventing accidental user contact with the adhesive 116.

Although the adhesives intended to be used in the fasteners of the instant invention should be quick setting, it may be desirable to also provide instantaneous adhesive capability. Accordingly, FIGS. 12 and 13 illustrate the use of wall 120. Wall 120 has a surface 122 lying in the plane of the first surface 106. The surface 122 comprises a pressure sensitive adhesive. It will be appreciated that such materials are well known and need not be discussed further. When the fastener is deployed against a substrate 96, the pressure sensitive adhesive will cause the fastener to be temporarily "fixed" to the substrate while the adhesive 116 which has been expelled from the reservoir into the interface 118 sets up. With use of this particular embodiment, slower setting adhesives may be employed as adhesive 116.

Figure 14:
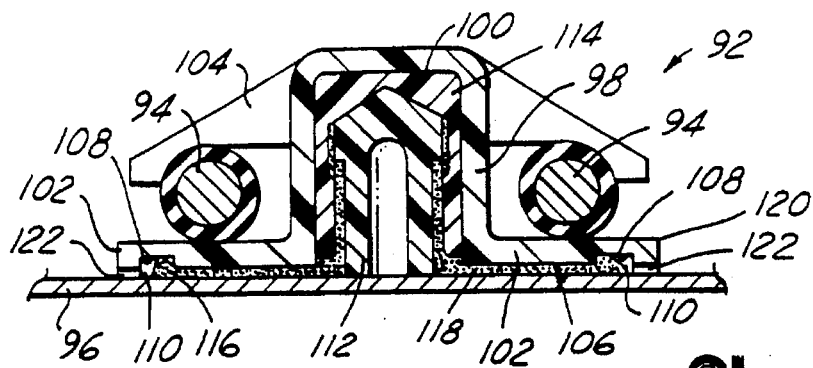
FIG. 14 is a cross-sectional view taken along the line 14—14 of the fastener of FIG. 13 mounted on substrate.
Figure 15:
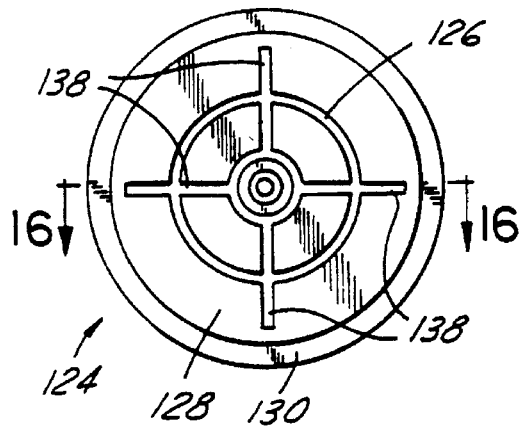
FIG. 15 is a bottom view of a fastener comprising a fourth alternative embodiment of the invention.
Figure 16:
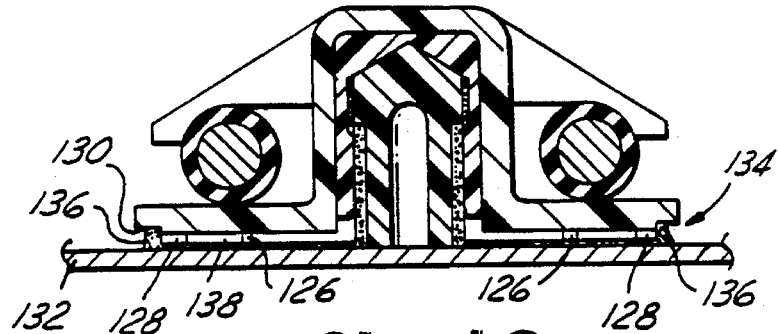
FIG. 16 is a cross-sectional view taken on the line 16—16 of the fastener of FIG. 15 mounted on a substrate.
Figure 17:
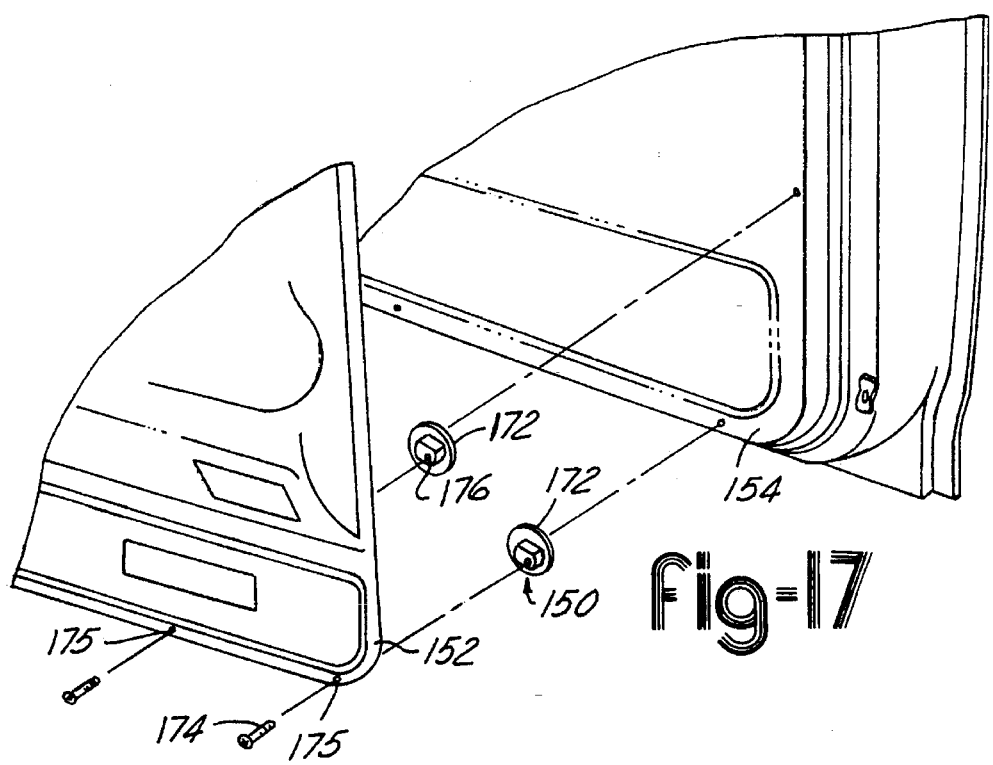
FIG. 17 is an exploded perspective of an alternative embodiment of the invention in use.

FIGS. 14 and 15 illustrate a fourth alternative embodiment of the invention based on the fastener illustrated in FIGS. 12 and 13. A fastener 124 has a concentric circular strip 126 of pressure sensitive adhesive lying in the plane of the first surface 128 which is surrounded by second surface 130. Second surface 130, however, lies in a plane which is displaced from the plane in which first surface 128 lies to provide, as illustrated in FIG. 15, a space 134 into which excess adhesive 136 will flow from interface 137 and be contained.

In this embodiment, concentric circular strip 126 is quartered by means for distributing 138. Means for distributing 138 is comprised of four channels which guide the adhesive 136 from the reservoir 133 throughout the first surface 128.

Although it is most preferred that the fasteners of the instant invention incorporate the second surface or overhanging safety ledge, discussed in the above embodiments, to it is not necessary for the operation of the adhesively securable fastener of the invention. FIGS. 17–25 illustrate two alternative embodiments of the adhesively securable fastener of the instant invention wherein the second overhanging surface described above is not present.

Turning to FIGS. 17–20, it can be seen that fastener 150 may be used as a blind fastener to attach the components of an automotive side door. Trim panel 152 is attached to door inner panel 154 with the use of fastener body 150. Trim panel 152 is attached to fastener body 150 by means of screwing screw 174 into hole 176. Most preferably, screw 174 extends through hole 175 in trim panel 152 and is screwed into hole 176 in fastener 150 prior to the deployment of surface 172 against door inner 154. Thus, fastener 154 maybe used as a blind fastener. However, it will be appreciated by those skilled in the art that fastener 150 could be adhesively secured to door inner 154 prior to the securement of screw 174 in hole 176.

Figure 18:
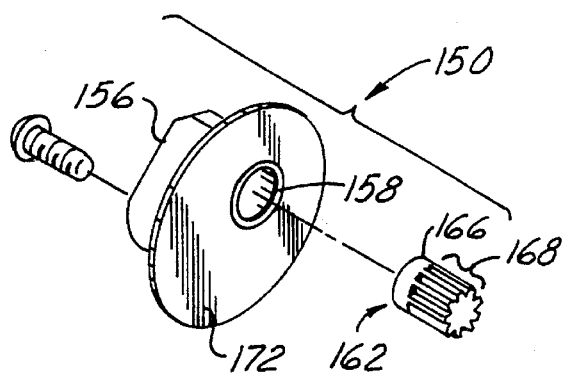
FIG. 18 is an exploded perspective of the elements of the adhesively securable fastener of FIG. 17.

Turning to FIG. 18, it can be seen that fastener 150 comprises rigid fastener body 156 in which reservoir 158 is disposed. Fastener body 156 is most preferably comprised of a hard ABS. Disposed within reservoir 158 is liquid adhesive 160. Reservoir 158 containing liquid adhesive 160 is sealed with means for displacing 162. It will be appreciated that the preceding discussion with respect to the components and materials comprising the fastener body, reservoir and liquid adhesive, etc. apply to the instant alternative embodiment.

Means for displacing 162 fits within the open end 164 of reservoir 158. It will be appreciated that the configuration of means for displacing 162 is analogous to those means for displacing discussed above. The first portion 166 of means for displacing 162 is configured so as to fit snugly within the open end 164 of reservoir 158. The extension of first portion 166 into reservoir 158 creates a seal such that a liquid adhesive contained in the reservoir is maintained in a liquid state prior to adhesive application of the fastener 150.

Figure 19:
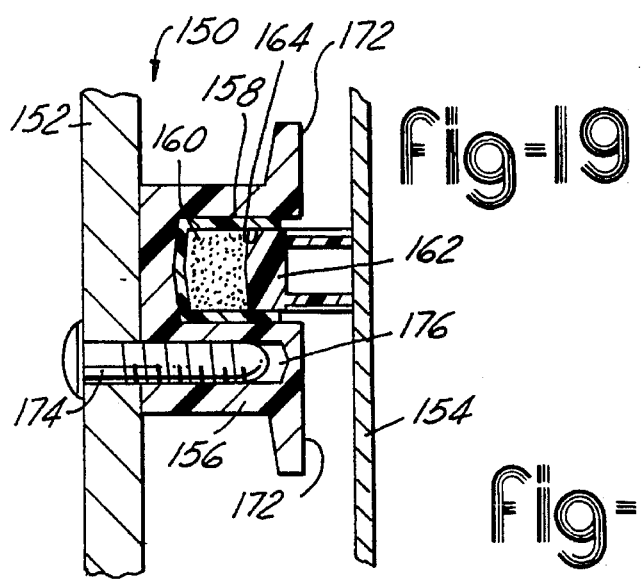
FIG. 19 is a cross-sectional view taken on the line 19—19 of FIG. 18 showing the assembled fastener immediately prior to adhesive application to a substrate.
Figure 20:
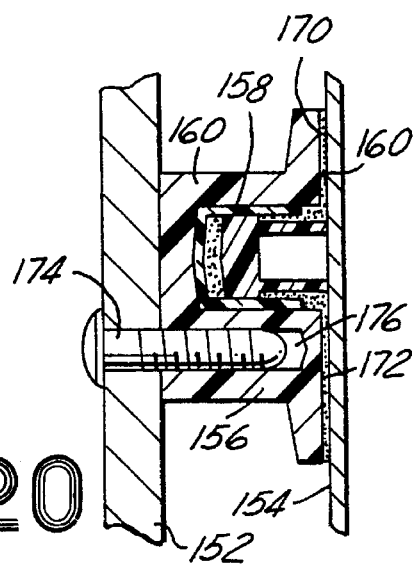
FIG. 20 is a cross-sectional view of the fastener of FIG. 19 immediately after application to a substrate.

Thus, as indicated in FIG. 19, when the fastener 150 is a non-deployed state, the means for displacing 162 will be positioned with the first portion 162 wedged within the open end 164 of reservoir 158 such that the second portion 168 of means for displacing 162 extends outward and beyond fastener body 156.

When it is desired to adhesively apply fastener 150 to an underlying substrate such as door inner 154, the first surface 172 of fastener body 150 is directed toward the substrate 154. As a result, means for displacing 162 is pushed into reservoir 158 to dispel liquid adhesive 160 into interface 170. Interface 170 is created by the placement of first surface 172 against substrate 154.

Figure 21:
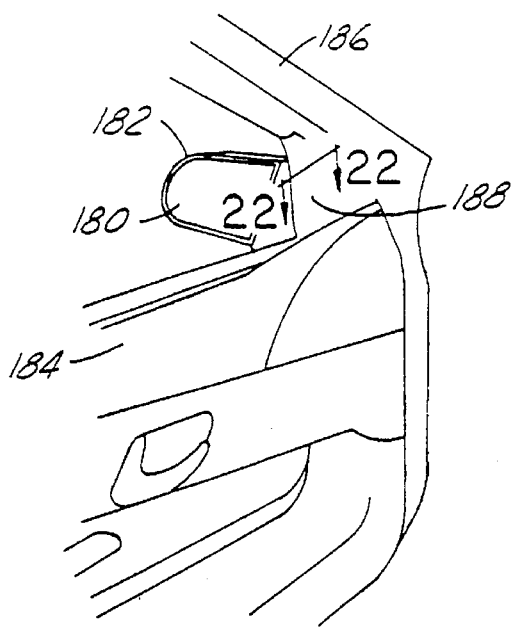
FIG. 21 is a perspective view of the interior of an automobile showing a mirror patch panel.

Another alternative embodiment of the instant invention lacking the overhanging ledge is illustrated in FIGS. 21–25. FIG. 21 provides a perspective view of the interior of an automobile from the driver's or left passenger's side. It will be appreciated that mirror 180 is visible through window 182. Disposed between door 184 and support beam 186 is a triangular, curved mirror patch 188. Mirror patch 188 is comprised of a suitable plastic such as polypropylene and is intended to hide non-asthetically pleasing wires and the like required for the proper functioning of mirror 180.

Figure 24:
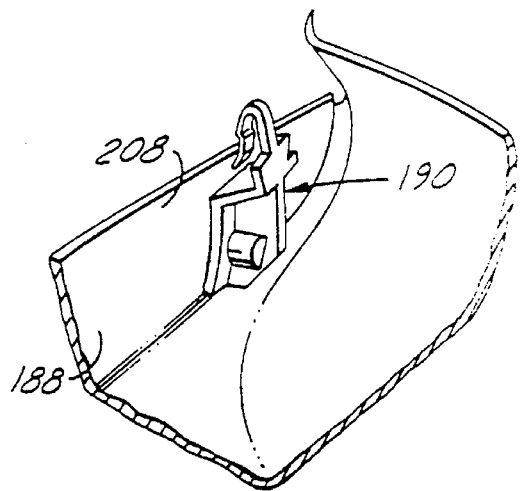
FIG. 24 is a back perspective view of the mirror patch panel of FIG. 21 showing the placement of the adhesively secured fastener.

Mirror patch 188 is attached to the underlying structure with the use of fastener 190. Fastener 190, illustrated in FIG. 25, is adhesively secured to mirror patch 188 as illustrated in FIG. 24 and mechanically fastens mirror patch 188 to sheet metal 192 with the use of flexible clip 214.

Figure 25:
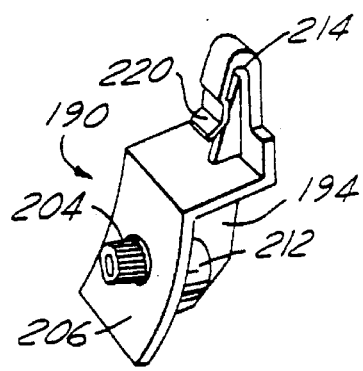
FIG. 25 is a perspective view of an alternative embodiment of the fastener of the instant invention utilized in FIGS. 21-24.
Figure 23:
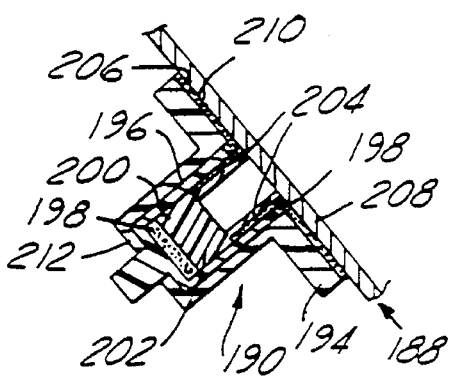
FIG. 23 is a cross-sectional view of the fastener of FIG. 22 taken on the line 23—23 of FIG. 22.

As indicated in FIGS. 23 and 25, fastener 190 is comprised of fastener body 194 which contains reservoir 196. Reservoir 196 resides within the portion 212 of fastener body 194. Disposed within reservoir 196 is liquid adhesive 198. Means for displacing 200 has a first portion 202 which fits snugly against the open end 204 of reservoir 196. When first portion 202 is secured against open end 204 of reservoir 196, second portion 204 of means for displacing 200 extends beyond surface 206 of fastener body 194. A seal is formed by the placement of first portion 202 against open end 204.

When first surface 206 is urged against or positioned next to the surface 208 of mirror patch 188, means for displacing 204 is displaced into reservoir 196. As a result, liquid adhesive 198 is expelled outward into the interface 210 created by the intimate contact of the first surface 206 with substrate 208.

Figure 22:
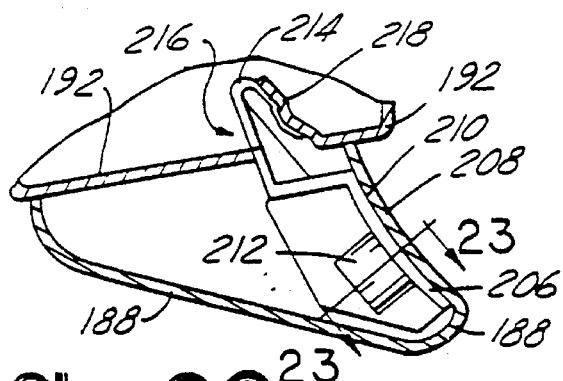
FIG. 22 is a cross-sectional view taken on the line 22—22 of FIG. 21 showing the mirror patch panel mechanically fastened to sheet metal with the use of an alternative embodiment of the instant invention.

Once fastener 190 is adhesively secured to mirror patch 188, mirror patch 188 is mechanically fastened to sheet metal 192 by virtue of flexible clip 214. Flexible clip 214 protrudes through an opening 216 in sheet metal 192. The flap 218 of sheet metal 192 may lie on top of flexible clip 214 as illustrated in FIG. 22 or may be broken off such that tab 220 of flexible clip 214 overhangs the remainder of sheet metal tab 218. In either case, it will be appreciated that flexible clip 214 may be compressed while entering the opening 216 and expanded once it extends therethrough. The expansion of flexible clip 214 precludes the reverse movement of flexible clip 214 through the sheet metal opening 214.

It will be appreciated that surface 208 of mirror patch 188 is curved and that surface 206 of fastener body 194 is correspondingly shaped so as to provide a close fit therebetween. When the liquid adhesive 160 is a cyanoacrylate, the mirror patch 188 will be primed to improve adhesive adhesion thereto.

While the best modes for carrying out the invention have been described in detail, those familiar with the art to which the invention relates will recognize various alternative designs and embodiments for practicing the invention as defined by the following claims.

We claim:

1. A fastener for adhesive attachment to a substrate having a body with at least one surface (128) capable of adhesive adherence to the substrate, the surface lying in a first plane, a reservoir in the body, and means (112) for displacing a liquid adhesive contained within the reservoir into an interface formed when the at least one surface is placed against the substrate; the invention characterized by:

said body (98) being rigid, nonflexible and hard; and a pressure sensitive adhesive (126) lying in the first plane and positioned to contact the substrate to provide a temporary attachment means to the substrate when the at least one surface is placed against the substrate.

2. The invention of claim 1 wherein said pressure sensitive (126) adhesive is contiguous with a portion of the at least one surface (128).

3. The fastener or claim 1 wherein the body is made of ABS.

4. The fastener of claim 1 further comprising an effective bonding amount of an adhesive disposed within the reservoir.

5. The fastener of claim 1 wherein the first surface includes means for distributing the adhesive throughout the interface.

6. The fastener of claim 4 wherein the adhesive is a quick-setting adhesive.

7. The fastener of claim 6 wherein the adhesive is comprised of a cyanocrylate.

8. The fastener of claim 1 wherein the means for displacing has a first portion extending into the reservoir and a second portion extending beyond the first surface, said means being displaced into the reservoir when the first surface is placed against the substrate.

\* \* \* \* \*